United States Patent
Kim et al.

(10) Patent No.: US 8,059,963 B2
(45) Date of Patent: Nov. 15, 2011

(54) TIME DIVISION DUPLEXING REMOTE STATION HAVING LOW-NOISE AMPLIFIER SHARED FOR UPLINK AND DOWNLINK OPERATIONS AND WIRED RELAY METHOD USING THE SAME

(75) Inventors: Sang-Ho Kim, Suwon-si (KR); Yun-Je Oh, Yongin-si (KR); Seong-Taek Hwang, Pyeongtaek-si (KR); Han-Lim Lee, Seoul (KR); Ki-Uk Song, Suwon-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 848 days.

(21) Appl. No.: 12/105,499

(22) Filed: Apr. 18, 2008

(65) Prior Publication Data
US 2008/0260388 A1 Oct. 23, 2008

(30) Foreign Application Priority Data

Apr. 18, 2007 (KR) .................. 10-2007-0037913

(51) Int. Cl.
*H04B 10/00* (2006.01)
(52) U.S. Cl. ............ 398/115; 398/41; 398/135; 398/79; 455/522; 455/562.1; 370/280; 370/328
(58) Field of Classification Search .............. 398/115, 398/41, 135, 136, 137, 138, 139, 164, 79, 398/40, 66, 67, 68, 58, 59, 72, 99, 100, 116, 398/128, 130, 117, 42; 455/84, 313, 318, 455/522, 507, 562.1; 370/503, 280, 342, 343, 401, 338, 328, 277, 315, 345
See application file for complete search history.

(56) References Cited

U.S. PATENT DOCUMENTS

| | | | | |
|---|---|---|---|---|
| 5,995,259 A | * | 11/1999 | Meli et al. | 398/92 |
| 6,122,083 A | * | 9/2000 | Ohta et al. | 398/1 |
| 7,783,266 B2 | * | 8/2010 | Hosokawa et al. | 455/84 |
| 7,899,084 B2 | * | 3/2011 | Cho et al. | 370/503 |

FOREIGN PATENT DOCUMENTS

| | | |
|---|---|---|
| JP | 07-131401 | 5/1995 |
| KR | 2006-19488 | 3/2006 |
| KR | 10-621054 | 8/2006 |

* cited by examiner

*Primary Examiner* — Hanh Phan
(74) *Attorney, Agent, or Firm* — Cha & Reiter, LLC (57) ABSTRACT

A wired relay method for using a remote station and an apparatus thereof for a Radio over Fiber (RoF) wired relay system supporting a Time Division Duplexing (TDD) wireless communication service, which shares an Low-Noise Amplifier (LNA) for both uplink and downlink operations. The remote station includes a block for dividing each of a downlink optical signal carrying service data and an optical signal carrying transmission/reception control information of the RoF wired relay system, which are input from a base station, a gain controller for separating an uplink Radio Frequency (RF) signal input from an antenna or a portion of a downlink RF signal output from a High-Power Amplifier (HPA) and for monitoring the strength of the input and output RF signals in order to control a gain of the LNA. A converter mutually converts an optical signal and an RF signal, an amplifier amplifies the converted RF signal, and an RF signal flow controller automatically controls uplink and downlink transmission paths of the amplified RF signal according to a transmission/reception status of the RoF wired relay system.

15 Claims, 9 Drawing Sheets

TIME DIVISION DUPLEXING REMOTE STATION HAVING LOW-NOISE AMPLIFIER SHARED FOR UPLINK AND DOWNLINK OPERATIONS AND WIRED RELAY METHOD USING THE SAME

CLAIM OF PRIORITY

This application claims the benefit of priority under 35 U.S.C. §119(a) from a Korean Patent Application filed in the Korean Intellectual Property Office on Apr. 18, 2007 and assigned Serial No. 2007-37913, the entire disclosure of which is hereby incorporated by reference in its entirety.

BACKGROUND OF THE INVENTION

1. Field of the Invention

The present invention relates to a wireless communication system. More particularly, the present invention relates to an optical link for exchanging Radio Frequency (RF) signals between a remote station and a base station in a Radio over Fiber (RoF) system using wireless the uplink/downlink signal transmission of a Time Division Duplexing (TDD) mobile communication system and the configuration of the RoF system.

2. Description of the Related Art

With the development of the wireless communication industry, various wireless communication schemes have been proposed. Thus, there is an added benefit in proposing a mobile communication network that can support a new/different wireless communication scheme other than an existing wireless communication scheme, and in addition, support the existing wireless communication scheme. In other words, a wireless environment where mobile communication networks supporting different wireless communication schemes co-exist is expected to emerge.

In such a wireless environment, users having mobility need to select a suitable wireless communication scheme for wireless conditions.

A $3^{rd}$ Generation (3G) wireless communication system has evolved to perform high-speed and high-capacity data communication, in addition to conventional voice communication.

Moreover, the 3G wireless communication system has been discussed by the $3^{rd}$ Generation Partnership Project (3GPP) that is the European asynchronous standardization organization and the 3GPP2 that is the U.S synchronous standardization organization. A representative scheme under discussion in the 3GPP is a Wideband Code Division Multiple Access (WCDMA) scheme and a representative scheme under discussion in the 3GPP2 is a Code Division Multiple Access (CDMA) scheme.

An existing wireless mobile communication system typically uses an optical relay station in order to enlarge its cell coverage and remove an electric wave shadow region. In particular, in an underground or the inside of a building which electric waves cannot reach, a wired optical relay station is widely used. The optical relay station is configured to be suitable for the existing wireless mobile communication system using a Frequency Division Duplexing (FDD) scheme such as CDMA or WCDMA. However, a recently emerging new wireless mobile communication system such as Mobile Worldwide Interoperability for Microwave Access (WiMAX), or Wireless Broadband Internet (Wibro), makes use of a Time Division Duplexing (TDD) scheme wherein the same frequency is used for both uplink signal transmission and downlink signal transmission. The uplink and downlink transmissions are distinguished by time. Therefore, a wired/wireless relaying technique suitable for the new wireless mobile communication system is required.

In a communication system using the TDD scheme, a base station may allocate, for example, all available time slots, or some available time slots to a particular terminal. Thus, uplink/downlink transmission capacity is relatively free to change the allocations of slots, thereby allowing asymmetric communication by means of variable allocation of time slots. In addition, the channel characteristics of uplink/downlink radio signals are the same. For these reasons, the TDD scheme is recognized as being suitable for a next generation wireless mobile communication system using multiple antennas.

However, a problem in the TDD scheme is that as the radius of a cell increases, there is a degradation in transmission efficiency as a guard time interval between transmission/reception time slots increases due to a round trip delay. As a result, the TDD scheme undergoes degradation in transmission efficiency in a wireless communication system such as a macro cell having a large radius.

In contrast, a wireless mobile communication system using the FDD scheme does not experience a time delay in transmission or reception because of using separate frequency bands for transmission and reception. Since there is no a round trip delay caused by a time delay, the FDD scheme is suitable for a cell having a large radius such as a macro cell. However, the FDD scheme is not suitable for use as a duplexing technique for asymmetric transmission because a transmission/reception frequency and is fixed.

With regard to mobile communications, the 3G mobile communication system and next generation wireless mobile communication systems such as Mobile WiMAX and International Mobile Telecommunication (IMT)-Advanced systems aim to support both a voice service and multimedia services having various traffic characteristics such as broadcasting and real-time video conferencing. In order to efficiently provide the services having variously desired characteristics, there is a need for a duplexing scheme considering asymmetry and continuity of uplink and downlink transmissions according to the characteristics of the services.

At the present time, the CDMA or WCDMA system uses the FDD scheme and a Global System for Mobile Communication (GSM), a Wireless Local Area Network (WLAN) system, and the Mobile WiMAX system use the TDD scheme. Since two of the resources that can be provided to a plurality of wireless communication service subscribers are time and frequency according to space, there have been studies conducted with regard to a method and system for appropriately allocating the two resources, (i.e., time and frequency) according to the needs of a wireless channel condition such as a hybrid duplexing technique, in addition to the two existing duplexing schemes TDD and FDD.

Figure 1:
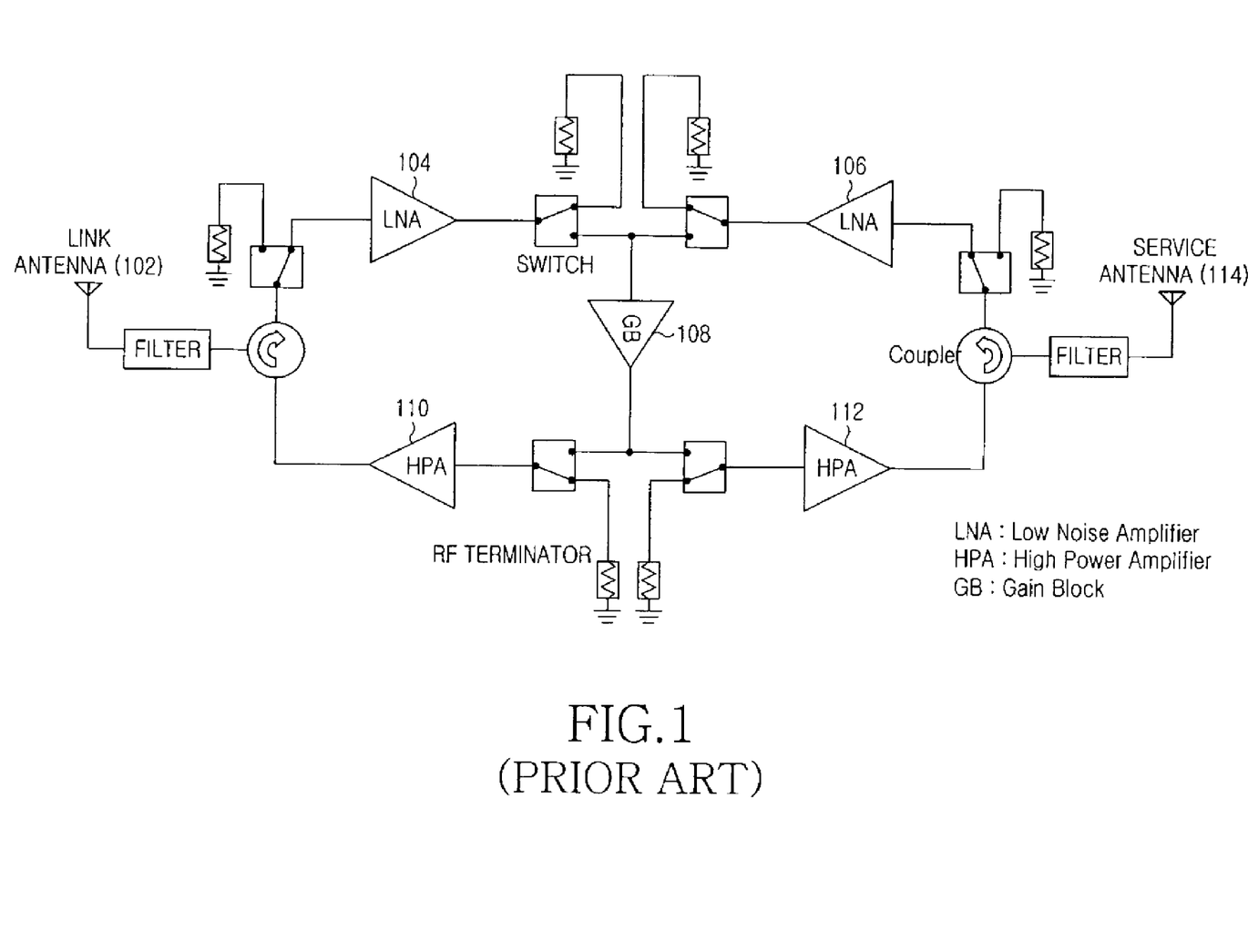
FIG. 1 illustrates the structure of a Radio Frequency (RF) relay station in a wireless relay system for a conventional Time Division Duplexing (TDD) wireless communication service.

FIG. 1 illustrates the structure of an RF relay station used to increase service capacity and enlarge service coverage in a wireless relay system for a conventional TDD wireless communication service.

Referring to FIG. 1, in order to provide a downlink signal transmission, link antenna 102 of the RF relay station receives an RF signal from a base station (not shown) and a band corresponding to the bandwidth of the RF signal is passed using a filter. The RF signal received through a circulator is amplified by a Low Noise Amplifier (LNA) 104. The frequency band of the RF signal from the LNA 104 is adjusted by a Gain Block (GB) 108. The RF signal whose frequency band has been adjusted is amplified by a High Power Amplifier (HPA) 112 and then passes through the filter through the circulator. The RF signal is then transmitted to a mobile terminal via a service antenna 114.

For an uplink transmission, the processing direction is opposite to that of downlink transmission described herein above. In other words, an RF signal is received from a mobile terminal (not shown) via the service antenna 114 of the RF relay station and a band corresponding to the bandwidth of the RF signal is passed using the filter The RF signal received through the circulator is amplified by the LNA 106. The frequency band of the RF signal from the LNA 106 is adjusted by the GB 108. The RF signal, whose frequency band has been adjusted is amplified by the HPA 112, then passes through the filter through the circulator/coupler. The RF signal is then transmitted to the mobile terminal via the link antenna 102.

However, in conventional techniques including that illustrated in FIG. 1, a GB can be shared for both uplink and downlink as a middle part of relatively low importance of the relay station. However, sharing of an LNA, which is a component of relatively high importance of the relay station, for both uplink and downlink communication is physically difficult to achieve. One reason that there is difficulty in sharing an LNA is that an HPA which finally amplifies uplink and downlink signals is typically connected to two antennas. Moreover, the sharing of the LNA for amplification of both uplink and downlink signals prevents the LNA from performing its essential function of maintaining low-noise amplification characteristics, which thereby degrades system performance.

SUMMARY OF THE INVENTION

An exemplary aspect of the present invention is to address in part at least some of the above problems and/or disadvantages and to provide at least the advantages described herein below. Accordingly, an exemplary aspect of the present invention is to provide an economically and efficiently implemented a Time Division Duplexing (TDD) wireless communication system sharing an Low-Noise Amplifier (LNA) for both uplink and downlink operations, and a wired relay method using the TDD wireless communication system by suggesting a method in which limitations in maximizing the efficiency of a hardware structure in a conventional TDD Radio Frequency (RF) relay station can be more flexibly overcome for a TDD wired relay system.

According to one exemplary aspect of the present invention, there is provided a Time Division Duplexing (TDD) relay remote station which shares a Low-Noise Amplifier (LNA) for uplink and downlink operations. The TDD relay remote station includes a converter for dividing an optical signal input from a base station or an antenna and mutually converting the optical signal and a Radio Frequency (RF) signal, an amplifier for amplifying the converted RF signal, and an RF signal flow controller for configuring uplink and downlink transmission paths of the amplified RF signal.

According to another exemplary aspect of the present invention, there is provided a wired relaying method in a Time Division Duplexing (TDD) relay remote station which shares a Low-Noise Amplifier (LNA) for uplink and downlink operations. The wired relaying method includes a downlink operation mode in which a downlink optical signal is input from a base station and is output to an antenna via the LNA and an uplink operation mode in which an uplink Radio Frequency (RF) signal is input from the antenna and is transmitted to the base station via the LNA.

BRIEF DESCRIPTION OF THE DRAWINGS

The above and other features and advantages of an exemplary embodiment of the present invention will become more apparent from the following detailed description taken in conjunction with the accompanying drawings, in which.

Throughout the drawings, the same drawing reference numerals will be understood to refer to the same elements, features and structures.

DETAILED DESCRIPTION OF THE INVENTION

The matters defined in the description such as an exemplary detailed construction and elements are provided to assist in a comprehensive understanding of an exemplary embodiment of the invention. Accordingly, those of ordinary skill in the art will recognize that various changes and modifications of the exemplary embodiments described herein can be made without departing from the spirit of the invention and the scope of the appended claims. Also, descriptions of well-known functions and constructions may omitted for clarity and conciseness, when such inclusion might obscure appreciation of the subject matter of the present invention to a person of ordinary skill in the art.

Figure 2:
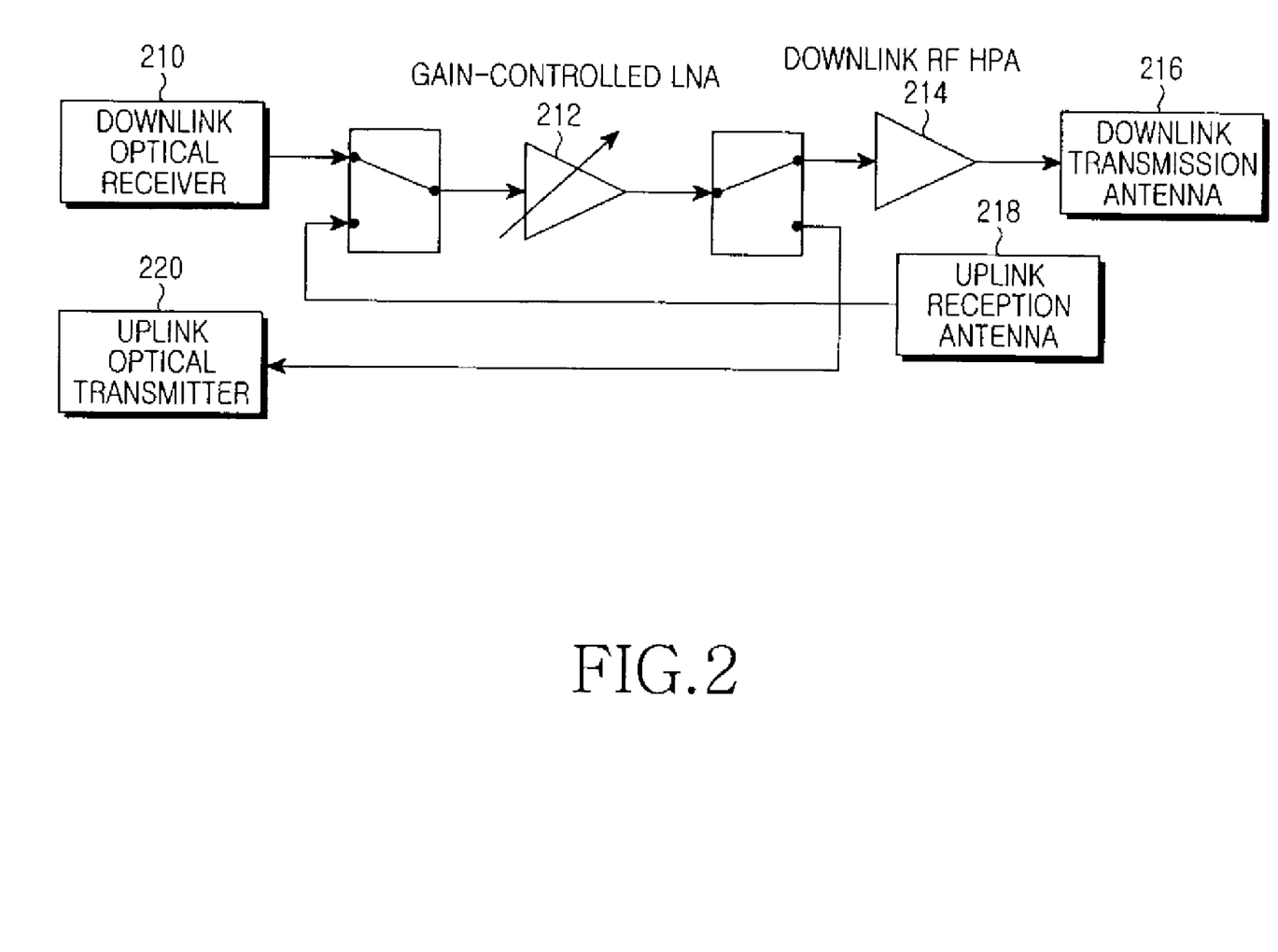
FIG. 2 illustrates the structure of a remote station for wired relay of a TDD wireless communication service, which shares a Low-Noise Amplifier (LNA) for uplink and downlink operations, according to an exemplary embodiment of the present invention.

FIG. 2 illustrates the structure of a remote station for wired relay of a TDD wireless communication service, which shares a Low-Noise Amplifier (LNA) for uplink and downlink operations, according to an exemplary embodiment of the present invention.

In FIG. 2, the remote station for wired relay of the TDD wireless communication service of the present invention uses an LNA whose gain is controlled according to an uplink operation mode and a downlink operation mode as an uplink/downlink common amplifier. A Radio Frequency (RF) signal output from a downlink optical receiver 210 passes through the uplink/downlink common amplifier, i.e., the LNA 212, thereby being low-noise amplified. The low-noise amplified RF signal then passes through a switch and a High Power Amplifier (HPA) 214 in order to be high-power amplified. The high-power amplified RF signal is then transmitted via a downlink signal antenna 216.

On the other hand, still referring to FIG. 2, a low-power RF signal received via an antenna passes through the uplink/downlink common amplifier 212 and is then low-noise amplified and amplified to an appropriate power level. The amplified RF signal is transmitted to a base station (not shown) by an uplink optical transmitter 220 through an optical signal.

The LNA 212 allows for gain control, and its gain is controlled at a value that makes the quality of an amplified RF signal transmitted to an antenna best in a transmission mode where a relay station amplifies and transmits a downlink signal, as will be described in detail with reference to FIG. 3.

For purposes of understanding by a person of ordinary skill in the art the term best in this instance refers to more than the predetermined reference value by a user. Thus, the value would be greater than a predetermined reference value.

Figure 3:
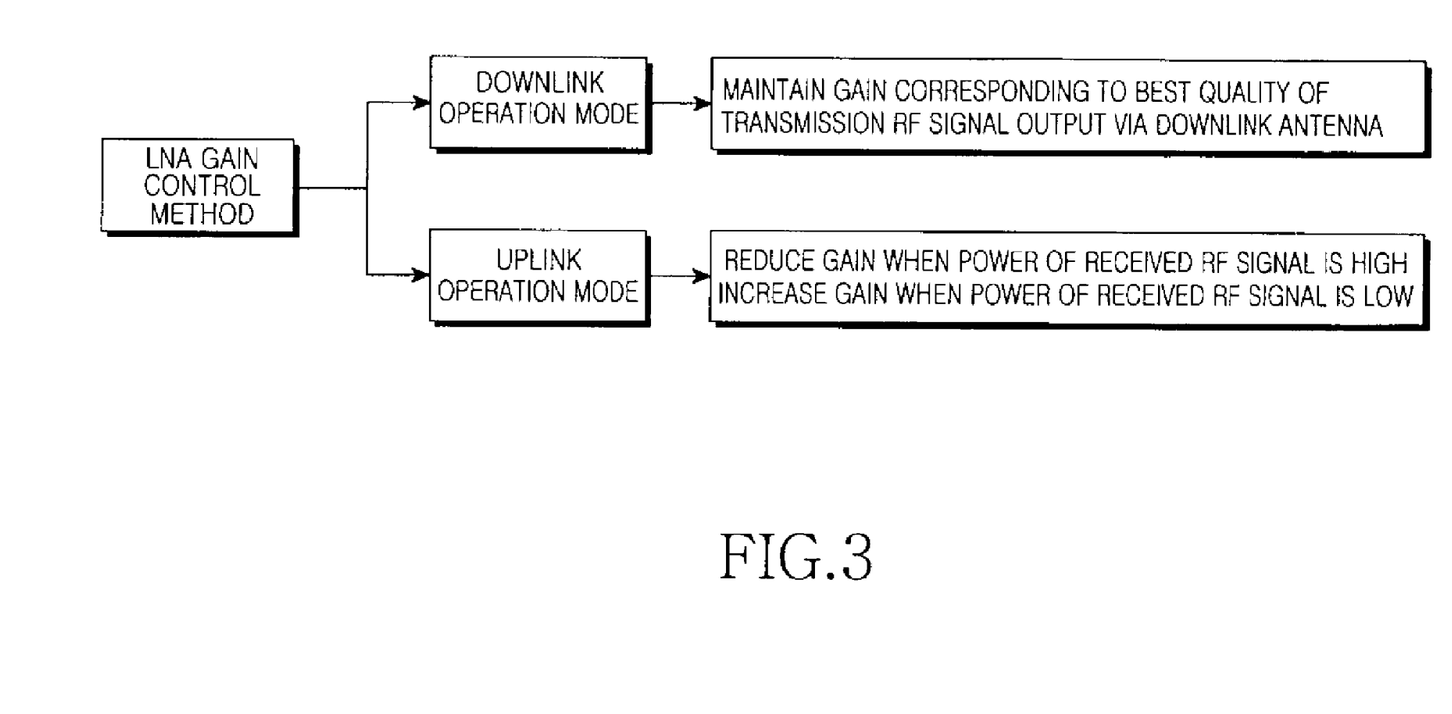
FIG. 3 is a block diagram illustrating an LNA gain control method in which a gain is controlled according to an uplink operation mode and a downlink operation mode according to an exemplary embodiment of the present invention.

FIG. 3 is a block diagram illustrating an LNA gain control method in which a gain of the LNA is controlled according to an uplink operation mode and a downlink operation mode according to an exemplary embodiment of the present invention. Generally, in terms of design of a multi-stage RF amplifier, a gain of an initial-stage amplification block or an intermediate-stage amplification block is not proportional to the signal quality of an output from a final-stage amplification block. Thus, for example, a gain of the LNA shared for uplink and downlink operations is not necessarily fixed to a maximum value at all times and may be set to an appropriate value during an initial setting of the relay station.

On the other hand, with reference to FIG. 3, in a reception mode where the LNA amplifies an uplink signal input from an antenna and inputs the amplified signal to an uplink optical transmitter, the LNA operates in an automatic gain control mode. In other words, when the power of an RF signal received from an antenna is low, the gain of the LNA is increased. When a mobile terminal is assumed to be located near a relay station antenna, the power of the received RF signal may be high. In this case, the gain of the LNA is reduced in order to maintain the strength of a signal input to the uplink optical transmitter constant. It can be seen that LNA control corresponding to each of the transmission mode and the reception mode is automatically and smoothly performed in the remote station illustrated in FIG. 3.

In the following description, the structure of a TDD remote station using different optical signal wavelengths for uplink and downlink operations will now be described with reference to FIG. 4A. FIGS. 4B, 4C, and 4D to be described later correspond to the same exemplary embodiment of the present invention as that corresponding to FIG. 4A and a basic operating principle in FIGS. 4B through 4D is the same as in FIG. 4A.

FIGS. 4A through 4D show examples of a schematic diagram illustrating the function of a TDD remote station using different optical signal wavelengths for uplink and downlink operations according to an exemplary embodiment of the present invention. In FIGS. 4A through 4D, a solid line indicates a flow of an actual signal and a dotted line indicates a flow of a control signal.

Figure 4A:
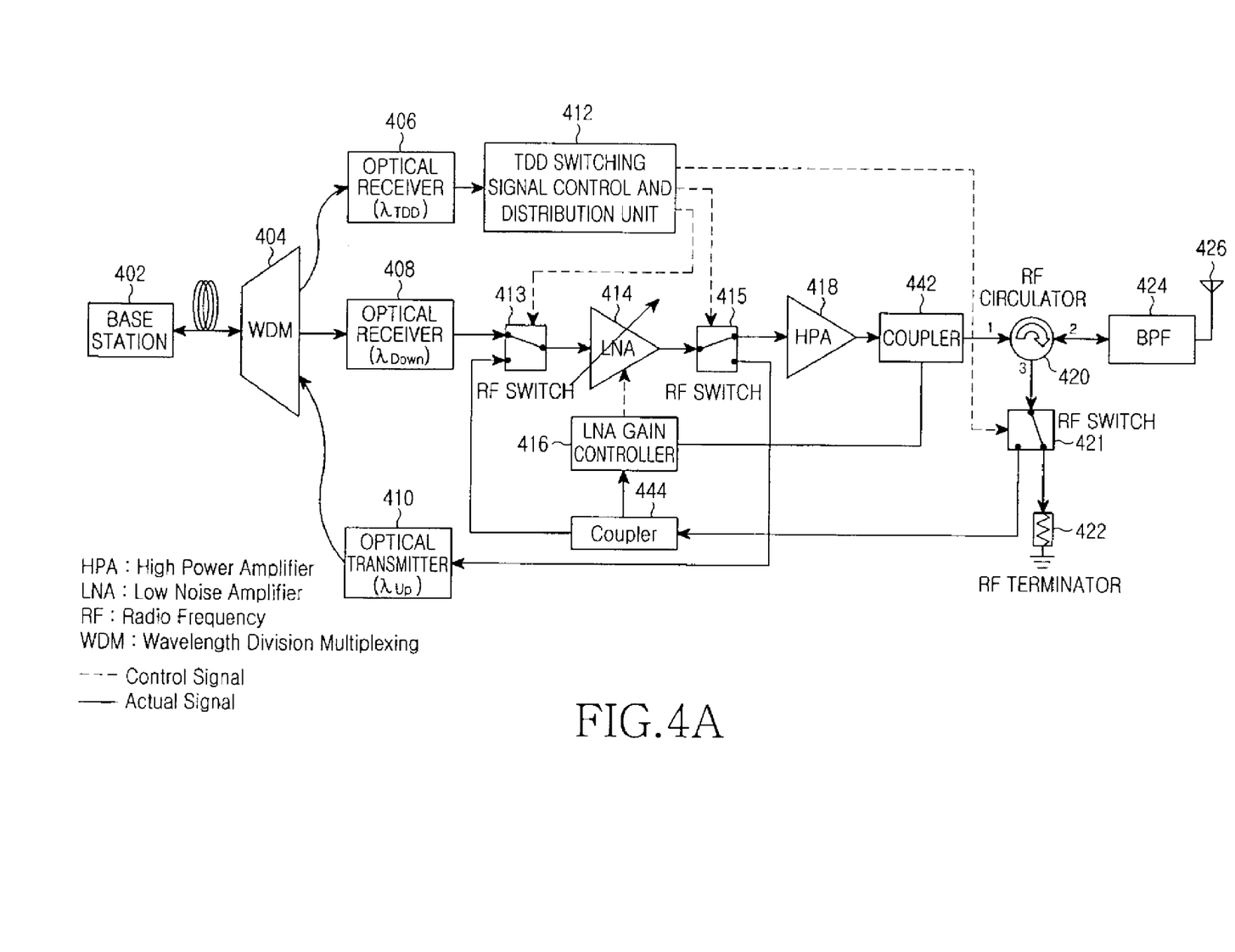
FIGS. 4A through 4D show examples of a schematic diagram illustrating the function of a TDD remote station using different optical signal wavelengths for uplink and downlink operations according to an exemplary embodiment of the present invention.
Figure 4B:
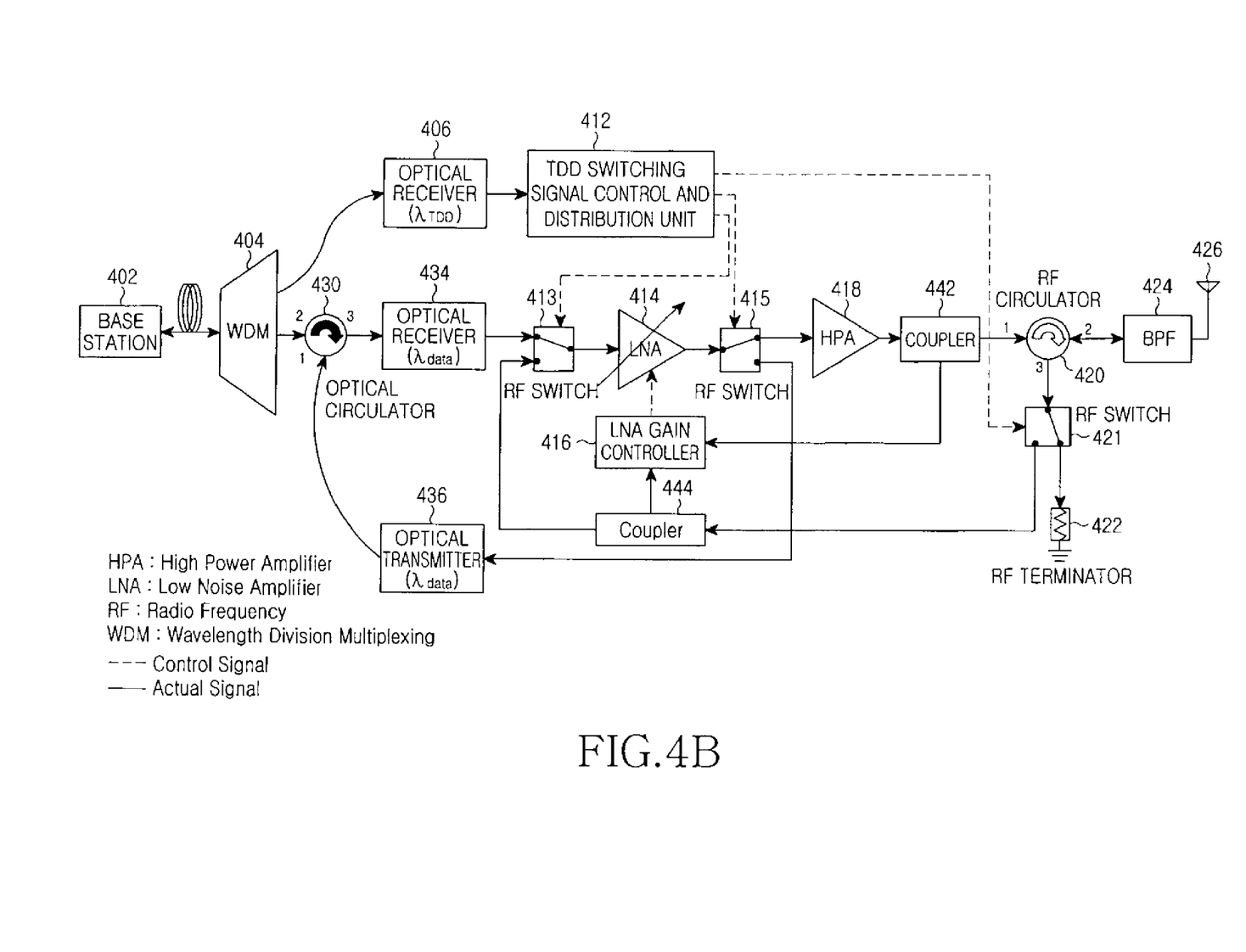
Figure 4C:
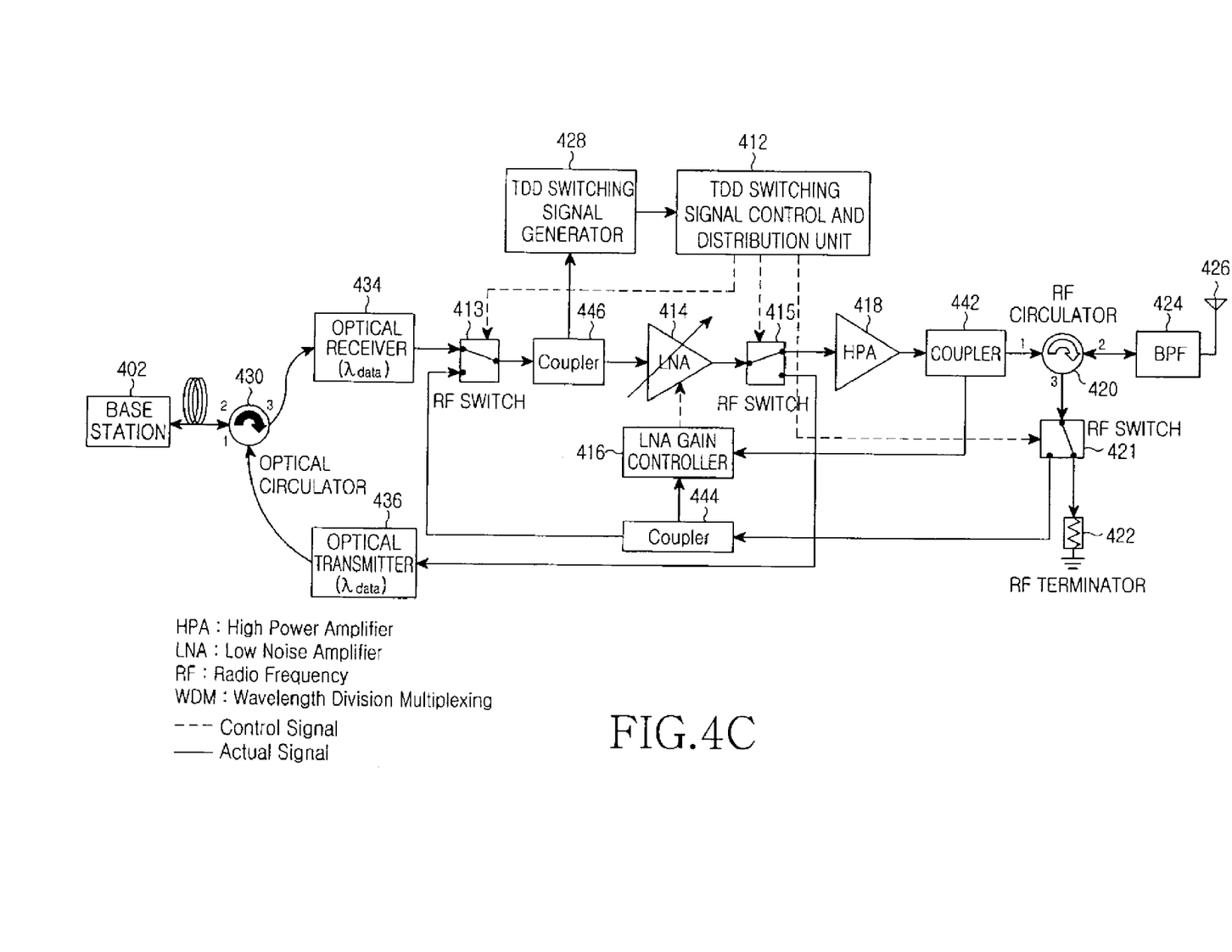
Figure 4D:
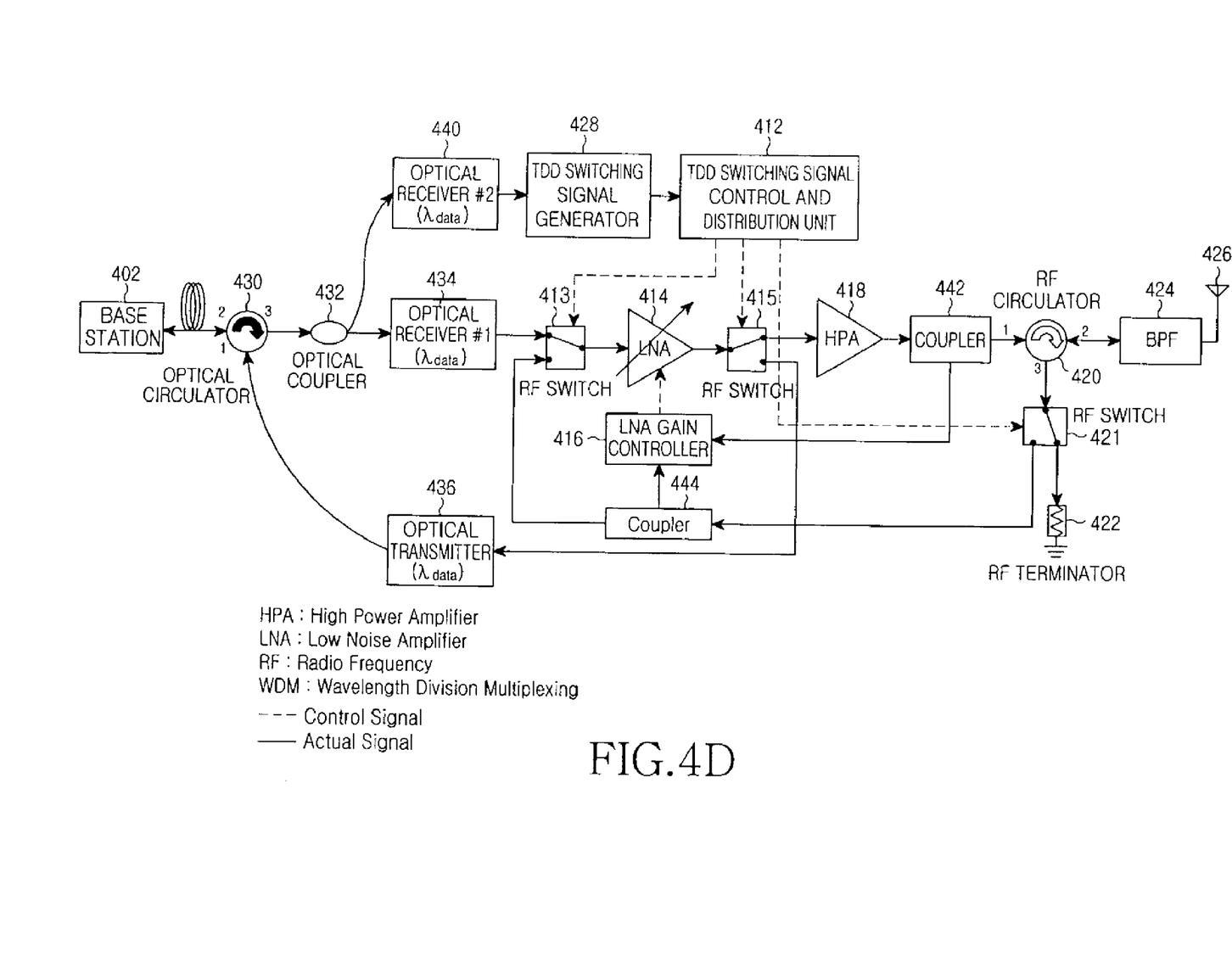

Referring to FIG. 4A, which illustrates one particular exemplary structure according to the present invention, a downlink optical signal input from a base station 402 includes optical signals of two wavelengths. An optical signal of a wavelength λTDD has control information for operating an RF switch 413 of the TDD remote station using a TDD scheme and an optical signal of a wavelength λDOWN includes a downlink service data signal. The optical signals are divided by an optical Wavelength Division Multiplexing (WDM) device 404. The divided optical signal of the wavelength λTDD is input to a corresponding optical receiver 406 and is convened into an electric signal. The electric signal is input to a TDD switching signal control and distribution unit 412 such that the TDD switching signal control and distribution unit 412 serves as a controller for distributing a TDD control signal to each of the RF switches 413, 413, 421.

The divided optical signal of the wavelength λDOWN is input to a corresponding optical receiver 408 and is converted into an RF signal including downlink transmission data. The RF signal passes through the first RF switch 413 and is low-noise amplified by an LNA 414 shared for uplink and downlink operations. The low-noise amplified RF signal passes through the second RF switch 415 and is then high-power amplified by a High Power Amplifier (HPA) 418. The amplified RF signal passes through an RF coupler 442, an RF circulator 420, and a Band Pass Filter (BPF) 424 which are passive elements, and then is output to an antenna 426. The RF coupler 442 and the RF circulator 420 will be described subsequently in greater detail.

On the other hand, still referring to FIG. 4A, when an uplink RF signal is received from the antenna 426, it passes through the BPF 424, the RF circulator 420, and the reception RF switch 421 and is then input to the RF coupler 444. The RF switch 421 is controlled in such a way to be connected to the LNA 414 only during reception time and to be connected to an RF terminator 422 during transmission time. The RF signal input to the RF coupler 444 passes through the RF switch and is low-noise amplified by the LNA 414 shared for uplink and downlink operations. The low-noise amplified RF signal passes through the RF switch and is then input to an uplink optical transmitter 410. The RF signal is then converted into an optical signal of a wavelength λUP including uplink data. The optical signal is transmitted to the base station 402 through the optical WDM device 404 via the same optical fiber link.

The RF coupler 442 shown in FIG. 4A is a passive element for separating a portion of a transmission or reception RE signal. The RF coupler 442 outputs an original RF signal, i.e., a signal to be serviced to a portable terminal via a circulator and an antenna, to a next stage. The RF coupler 442 outputs a separated RF signal, i.e., a signal having a strength of 10:1-20:1 of the strength of the original RF signal, to an LNA gain controller 416 for gain control, thereby monitoring an output such that a signal having the original set strength can be output as an output of the HPA 418. The RF coupler 444 to be described later also functions in the same manner as the RF coupler 442.

The RF circulator 420 is a passive element for circularly controlling a flow of an RF signal and is usually composed of three ports. An RF signal input to a port 1 is output via a port 2 and a signal input to the port 2 cannot be output via the port 1, but can be output via a port 3. A signal input to the port 3 cannot be output either via the port 1 or via the port 2. For example, an RF signal that is high-power amplified by the HPA 418 is input to the port 1 of the RF circulator 420, is output via the port 2, and is then transmitted to the antenna 426 through the connected BPF 424. On the other hand, during reception time, the HPA 418 is turned off and an RF signal having a relatively low strength, which is input from the antenna 426, passes through the BPF 424 and is input to the port 2 of the RF circulator 420 and then is output via the port 3. The output RF signal passes through the REF switch and is low-noise amplified by the LNA 414.

With regard to the functions of the LNA gain controller 416, the RF circulator 420, and the RF couplers 442 and 444 illustrated in FIG. 4A have the same effects as those illustrated in FIGS. 4B through 4D.

FIG. 4B shows a second example of a schematic diagram illustrating the function of the TDD remote station using different optical signal wavelengths for uplink and downlink operations according to an exemplary embodiment of the present invention. The structure illustrated in FIG. 4B is different from the basic structure illustrated in FIG. 4A in that it uses an optical circulator.

Referring to FIG. 4B, a downlink optical signal input from the base station 402 includes optical signals of two wavelengths. An optical signal of a wavelength λTDD includes control information for operating an RF switch 413 of the TDD remote station using the TDD scheme, and an optical signal of a wavelength λData includes a downlink service data signal. The optical signals of the two wavelengths are divided by the optical WDM device 404. The divided optical signal of the wavelength λTDD is input to the corresponding optical receiver 406 and is converted into an electric signal. The electric signal is input to the TDD switching signal control and distribution unit 412, thereby serving as a controller for distributing a TDD control signal to each of RF switches 413, 415, 421.

The optical signal of the wavelength λData passes through an optical circulator 430 and is input to a corresponding optical receiver #1 434. The optical signal is then converted into an RF signal including downlink transmission data, passes through an RF switch 413, and is then low-noise amplified by the LNA 414 shared for uplink and downlink operations. The low-noise amplified RF signal passes through the RF switch 415, is high-power amplified by the HPA 418, and is then output to the antenna 426 via the RF coupler 442, the RF circulator 420, and the BPF 424, which are passive elements.

On the other hand, when an uplink RF signal is received from the antenna 426, it is input to the RF coupler 444 via the BPF 424, the RF circulator 420, and the RF switch 421. The RF switch 421 is controlled in such a way to be connected to the LNA 414 only during reception time and to be connected to the RF terminator 422 during transmission time. The RF signal input to the RF coupler 444 passes through the RF switch 413 and is low-noise amplified by the LNA 414 shared for uplink and downlink operations. The low-noise amplified RF signal passes through the RF switch 415 and is input to the uplink optical transmitter 436. The RF signal is converted into an optical signal of a wavelength λData including uplink data and is transmitted to the base station 402 through the optical WDM device 404 via the same optical fiber link.

The optical circulator 430 illustrated in FIG. 4B uses the same wavelength for optical signals for transmitting and receiving uplink data and downlink data, thereby improving the efficiency of a system structure.

FIG. 4C shows a third particular example of a schematic diagram illustrating the function of the TDD remote station using different optical signal wavelengths for uplink and downlink operations according to an exemplary embodiment of the present invention. In FIG. 4C, the TDD remote station receives TDD switching control information required for a TDD switching operation from a TDD switching signal distribution unit instead of from a separate optical signal output from a base station in order to control reception RF switches converted from optical signals to RF signals.

Referring to FIG. 4C, an optical signal of a wavelength λData including a downlink service input from the base station 402 passes through the optical circulator 430 and is input to the corresponding optical receiver 434. The optical signal is converted into an RF signal including downlink transmission data, passes through the RF switch 413 and the RF coupler 446, and is then low-noise amplified by the LNA 414 shared for uplink and downlink operations. After the low-noise amplified RF signal passes through the RF switch 415 and then is high-power amplified by the HPA 418, it passes through the RF coupler 442, the RF circulator 420, and the BPF 424, which are passive elements, and is then output to the antenna 426.

In FIG. 4C, a TDD switching signal generator 428 for extracting and generating a TDD switching control signal generates an optical signal without using an optical signal of an additional wavelength λTDD like in FIG. 4A or 4B. The generated optical signal is converted to an electric signal and is input to the TDD switching signal control and distribution unit 412 such that the TDD switching signal control and distribution unit 412 serves as a controller for distributing a TDD control signal to each of the RF switches.

When an uplink RF signal is received from the antenna 426, it passes through the BPF 424, the RF circulator 420, and the RF switch 421 and is input to the RF coupler 444. The RF switch 421 is controlled in such a way to be connected to the LNA 414 only during reception time and to be connected to the RF terminator 422 during transmission time. The signal input to the RF coupler 444 passes through the RF switch 413 and the RF coupler 446 and is low-noise amplified by the LNA 414 shared for uplink and downlink operations. The low-noise amplified RF signal passes through the RF switch 415 and is input to the uplink optical transmitter 436 in order to be converted into an optical signal of a wavelength λData including uplink data. The optical signal is transmitted to the base station 402 through the optical circulator 430 via the same optical fiber link.

FIG. 4D shows a fourth example of a schematic diagram illustrating the function of the TDD remote station using different optical signal wavelengths for uplink and downlink operations according to an exemplary embodiment of the present invention. In FIG. 4D, in order to obtain TDD switching control information for the same purpose as in FIG. 4C, an optical signal is separated by an optical coupler that is a previous stage of an optical receiver instead of dividing an RF signal.

Referring now to FIG. 4D, an optical signal of a wavelength λData including a downlink service input from the base station 402 passes through the optical circulator 430 and the optical coupler 432 and is input to the corresponding optical receiver 434 in order to be converted into an RF signal including downlink transmission data. The RF signal passes through the RF switch 413 and is low-noise amplified by the LNA 414 shared for uplink and downlink operations. The low-noise amplified RF signal passes through the RF switch 415 and is high-power amplified by the HPA 418. The high-power amplified RF signal passes through the RF coupler 442, the RF circulator 420, and the BPF 424, which are passive elements, and is then output to the antenna 426.

Like in FIG. 4C, in FIG. 4D, the TDD switching signal generator 428 for extracting and generating a TDD switching control signal generates an optical signal, and the generated optical signal is converted into an electric signal and is input to the TDD switching signal control and distribution unit 412 such that the TDD switching signal control and distribution unit 412 serves as a controller for distributing a TDD control signal to each of RF switches 413, 415, 421. However, the fourth example illustrated in FIG. 4D is different from that illustrated in FIG. 4C in that an optical signal of a wavelength λData separated by the optical coupler 432 is input to the corresponding optical receiver #2 440 and is then input to the TDD switching signal generator 428 such that the TDD switching signal control and distribution unit 412 serves as a controller for distributing a TDD control signal to each of the RF switches.

On the other hand, still referring to FIG. 4D, when an uplink RF signal is received from the antenna 426, it passes through the BPF 424, the RF circulator 420, and the reception RF switch 421 and is input to the RF coupler 444. The RF switch 421 is controlled in such a way to be connected to the LNA 414 only during reception time and to be connected to the RF terminator 422 during transmission time. The RF signal input to the RF coupler 444 passes through the first RF switch 413 and the RF coupler 446 and is low-noise amplified by the LNA 414 shared for uplink and downlink operations. The low-noise amplified RF signal passes through the second RF switch 415 and is input to the uplink optical transmitter 436 in order to be converted to an optical signal of a wavelength λData including uplink data. The optical signal is then transmitted to the base station 402 through the optical circulator 430 via the same optical fiber link. In the following description, basic flows of uplink and downlink optical signals in the TDD remote station will be described with reference to FIGS. 5 and 6.

Figure 5:
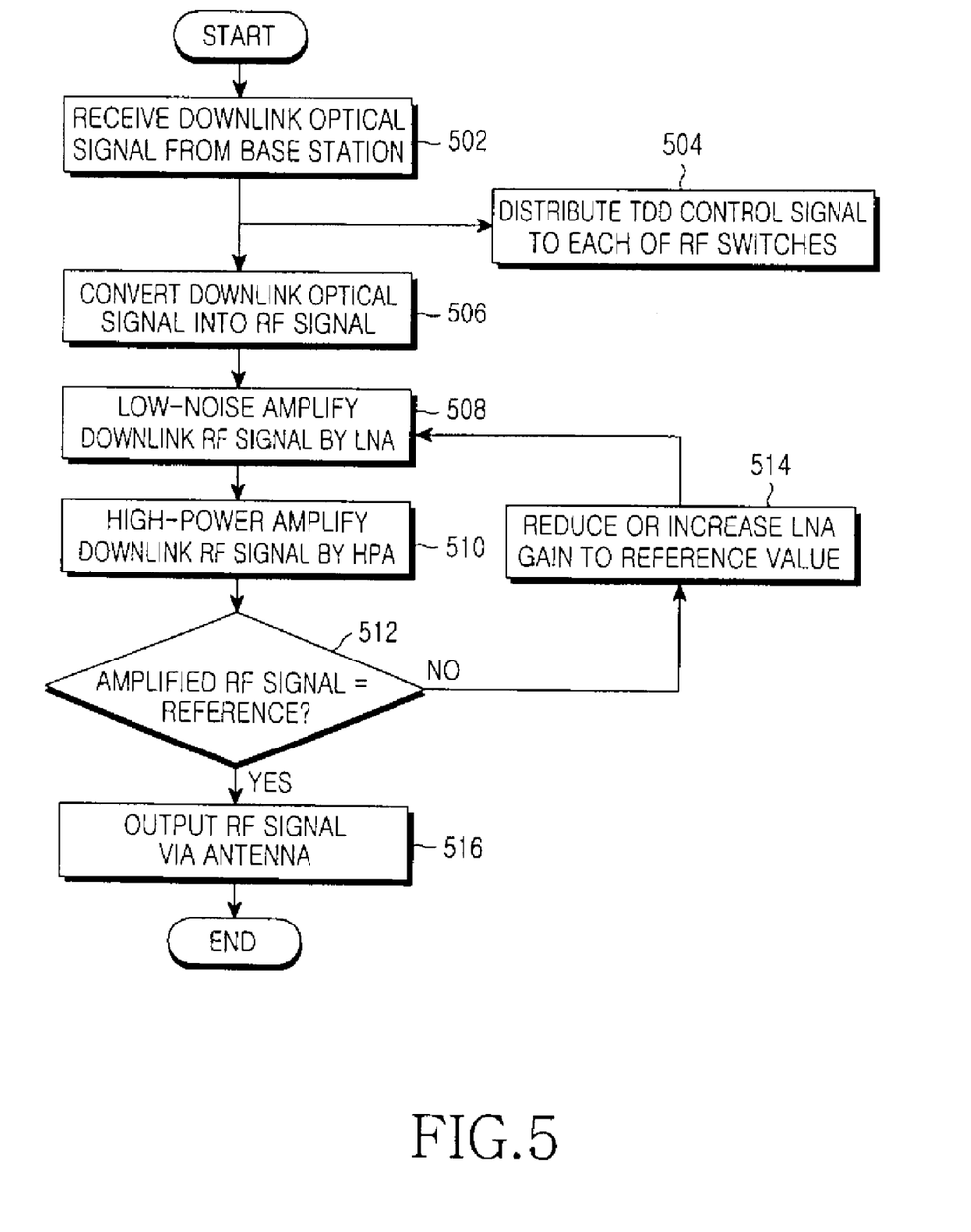
FIG. 5 is a flowchart illustrating a basic flow of a downlink optical signal and a converted RF signal in a TDD remote station according to an exemplary embodiment of the present invention.

FIG. 5 is a flowchart illustrating one way that a basic flow of a downlink optical signal and a converted RF signal in the TDD remote station might operate according to an exemplary embodiment of the present invention in accordance with, for example apparatus such as shown in FIGS. 4A-4D.

Referring to FIG. 5, in step 502, a downlink optical signal is input from a base station. Prior to step 506, a controller function of distributing a TDD control signal to each of RF switches is performed through a TDD switching signal control and distribution unit in step 504. The downlink optical signal input from the base station is converted into an RF signal by an optical receiver in step 506, and the RF signal is low-noise amplified by an LNA shared for uplink and downlink operations in step 508. The low-noise amplified RF signal is high-power amplified by an HPA in step 510. The RF signal that has been low-noise amplified by the LNA and high-power amplified by the HPA goes to step 512. In step 512, it is determined whether the RF signal received from the HPA has the same value as a predetermined reference value. If not, the gain of the LNA is increased or reduced to a predetermined reference value by an LNA gain controller in step 514 and step 508 is performed. If the RF signal received from the HPA has the same value as the predetermined reference value, step 516 is performed in order to output the amplified RF signal via the antenna.

In FIG. 5, step 504 where the controller function of distributing the TDD control signal to each of RF switches is performed through the TDD switching signal control and distribution unit may use an optical signal of an additional wavelength, such as in FIGS. 4A through 4D, or, for example, use an element for extracting and generating a TDD switching control signal, i.e., a TDD switching signal generator.

Step 512 is performed by an RF coupler. Thus, in order to maintain the gain of the LNA as the predetermined reference value when the gain of the LNA becomes greater or less than a predetermined level during transmission/reception time, the RF coupler separates a portion of the original RF signal and transmits the separated portion to the LNA gain controller and the LNA controller monitors an output.

Figure 6:
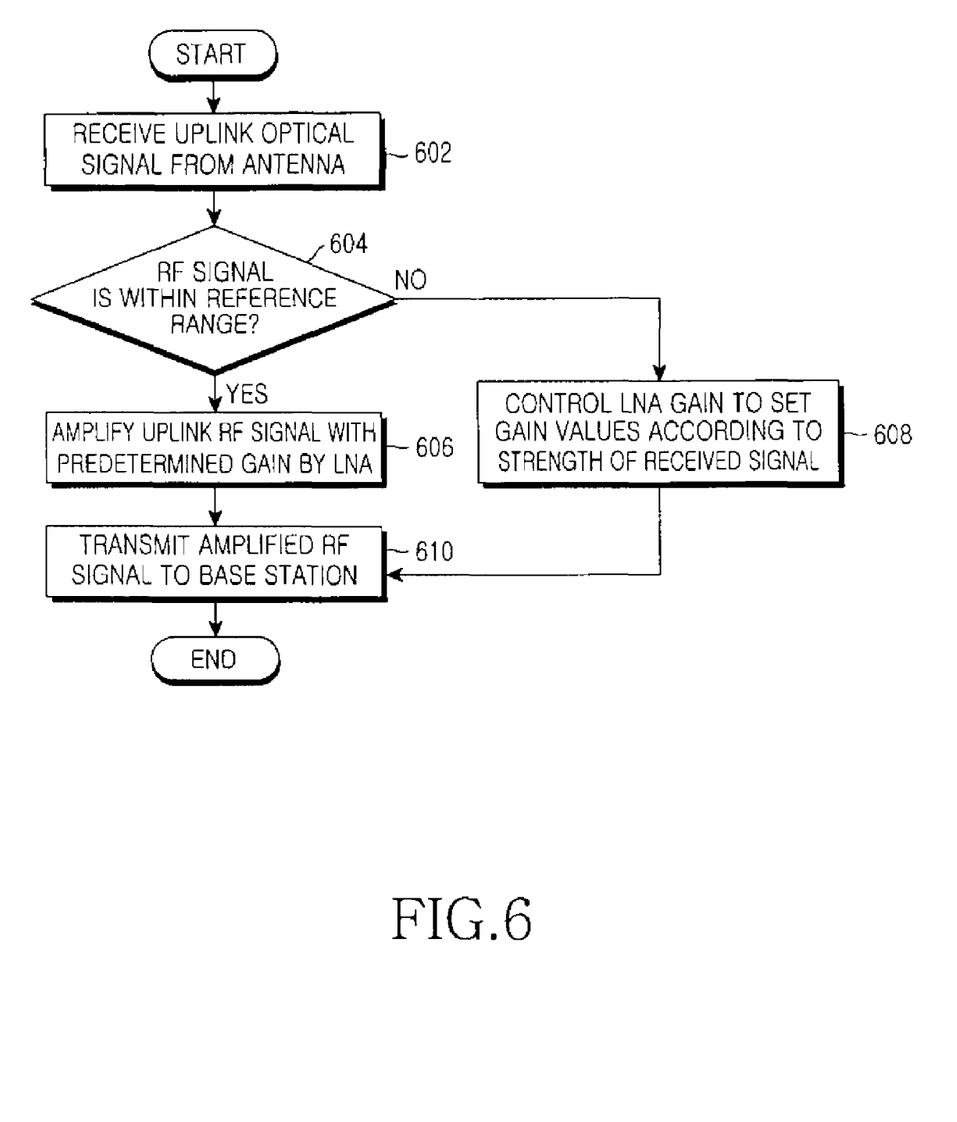
FIG. 6 is a flowchart illustrating a basic flow of an uplink RF signal in a TDD remote station according to an exemplary embodiment of the present invention.

FIG. 6 is a flowchart illustrating one way that a basic flow of an uplink RF signal in a TDD remote station may operate according to an exemplary embodiment of the present invention.

Referring now to FIG. 6, an uplink optical signal is input from an antenna in step 602. In step 604, it is determined whether the input RF signal is within a predetermined reference value range. If not, the gain of the LNA is controlled to gain values that are set according to the strength of the input RF signal by the LNA gain controller in step 608. If the input RF signal is within the predetermined reference value range, the uplink RF signal is low-noise amplified with a corresponding set gain value by the LNA shared for uplink and downlink operations in step 606. The low-noise amplified RF signal is transmitted to the base station in step 610.

Similar to step 512 of FIG. 5, step 604 of FIG. 6 can be performed by the RF coupler. Thus, in order to maintain the gain of the LNA as a predetermined reference value when the gain of the LNA becomes greater or less than a predetermined level during transmission/reception time, the RF coupler separates a portion of the original RF signal and transmits the separated portion to the LNA gain controller and the LNA controller monitors an output.

As is apparent from the foregoing description, according to examples illustrated herein of the present invention, by applying a wired relay method of a TDD wireless communication system sharing an LNA for uplink and downlink operations to a system, a remote station can be economically and efficiently configured.

While the invention has been shown and described with reference to exemplary embodiments thereof, it will be understood by those skilled in the art that various changes in form and details may be made therein without departing from the spirit of the invention and the scope of the appended claims.

What is claimed is:

1. A wired relaying method in a Time Division Duplexing (TDD) relay remote station which shares an amplifier for uplink and downlink operations, the wired relaying method comprising:
    a downlink operation mode in which a downlink optical signal is input from a base station and is output as a downlink RF signal by an antenna received via the amplifier; and
    an uplink operation mode in which an uplink Radio Frequency (RF) signal is received via the antenna and is transmitted to the base station via the amplifier, wherein the amplifier is configured to share the uplink and downlink operation modes by means of RF switches positioned in front of and at the rear of the amplifier, the amplifier comprising:
        a Low-Noise Amplifier (LNA) for low-noise amplifying the uplink RF signal; and
        a High-Power Amplifier (HPA) for high-power amplifying the low-noise.

2. The wired relaying method of claim 1, wherein the output of the downlink optical to the antenna via the LNA comprises controlling a gain such that a signal to be finally transmitted via the antenna in the downlink operation mode maintains a best RF signal quality.

3. The wired relaying method of claim 1, wherein the transmission of the uplink RF signal to the base station via the amplifier comprises increasing a gain when a power of the uplink RF signal input from the antenna is determined as having a lower value than a predetermined reference value range, and reducing the gain when the power of the input uplink RF signal is determined as having a higher value than the predetermined reference value range, in the uplink operation mode.

4. The wired relaying method of claim 1, wherein the downlink operation mode comprises the steps of:
    low-noise amplifying, by the LNA, the downlink optical signal input from the base station;
    high-power amplifying, by the High Power Amplifier (HPA), the signal low-noise amplified by the amplifier; and
    transmitting the signal high-power amplified by the HPA via the antenna.

5. The wired relaying method of claim 1, wherein the uplink operation mode comprises the steps of:
   low-noise amplifying, by the LNA, the uplink RF signal input from the antenna; and
   transmitting the signal low-noise amplified by the LNA.

6. A Time Division Duplexing (TDD) relay remote station comprising:
   a converter for dividing a downlink optical signal input from a base station or a Radio Frequency (RF) signal received via antenna and mutually converting the downlink optical signal and the RF signal;
   an amplifier for amplifying the RF signal, comprises:
      a Low-Noise Amplifier (LNA) for low-noise amplifying the RF signal; and
      a High-Power Amplifier (HPA) for high-power amplifying the low-noise amplified downlink RF signal; and
   an RF signal flow controller for configuring uplink and downlink transmission paths of the amplified RF signal, wherein the amplifier is configured to share the uplink and downlink paths of the amplified RF signal by means of RF switches positioned in front of and at the rear of the amplifier, the amplifier operating in an uplink operation mode or a downlink operation mode according to the RF signal flow controller.

7. The TDD relay remote station of claim 6, wherein the converter comprises:
   an optical Wavelength Division Multiplexing (WDM) device for dividing each of an uplink optical signal and the downlink optical signal;
   an optical receiver for converting the downlink optical signal into a downlink RF signal; and
   an optical transmitter for converting the RF signal into an uplink optical signal.

8. The TDD relay remote station of claim 7, wherein the optical receiver receives and the optical transmitter transmits the respective downlink optical signal and uplink optical signal over different wavelengths, respectively.

9. The TDD relay remote station of claim 6, wherein the converter comprises:
   an optical Wavelength Division Multiplexing (WDM) device for dividing each of an uplink optical signal and the downlink optical signal;
   an optical receiver for converting the downlink optical signal into a downlink RF signal;
   an optical transmitter for converting the RF signal into an uplink optical signal; and
   an optical circulator for circularly controlling a flow of the uplink optical signal or the downlink optical signal.

10. The TDD relay remote station of claim 9, wherein the optical receiver and the optical transmitter use the same wavelength for transmission and reception of the uplink optical signal and the downlink optical signal.

11. The TDD relay remote station of claim 6, wherein the converter comprises:
   an optical receiver for converting the downlink optical signal into a downlink RF signal;
   an optical transmitter for converting the RF signal into an uplink optical signal;
   an optical circulator for circularly controlling a flow of the uplink optical signal or the downlink optical signal; and
   a TDD switching signal generator for generating a TDD control signal.

12. The TDD relay remote station of claim 11, wherein the TDD switching signal generator monitors and analyzes a portion of the RF signal generated by the optical receiver, separated by an RF coupler, without using an optical signal of an additional wavelength.

13. The TDD relay remote station of claim 6, wherein the converter comprises:
   an optical receiver for converting the downlink optical signal into a downlink RF signal;
   an optical transmitter for converting the RF signal into an uplink optical signal;
   an optical circulator for circularly controlling a flow of the uplink optical signal or the downlink optical signal;
   a TDD switching signal generator for generating a TDD control signal; and
   an optical coupler for separating a portion of the downlink optical signal or the uplink optical signal.

14. The TDD relay remote station of claim 13, wherein the optical coupler separates a portion of the downlink optical signal or the uplink optical signal before the optical signal is input to the optical receiver, the optical receiver converts the separated portion into an RF signal, and the TDD switching signal generator monitors and analyzes the converted RF signal in order to generate the TDD switching control signal.

15. The TDD relay remote station of claim 6, wherein the RF signal flow controller comprises:
   at least one RF switch for setting a path of the RF signal;
   an RF circulator for circularly controlling the input RF signal;
   at least one Band Pass Filter (BPF) for passing a band corresponding to a bandwidth of the RF signal; and
   at least one RF coupler for separating a portion of the RF signal and transmitting the separated portion to an amplifier gain controller for controlling a gain of the amplifier according to a predetermined power strength of the received separated portion of the RF signal.

* * * * *